Figure 1:
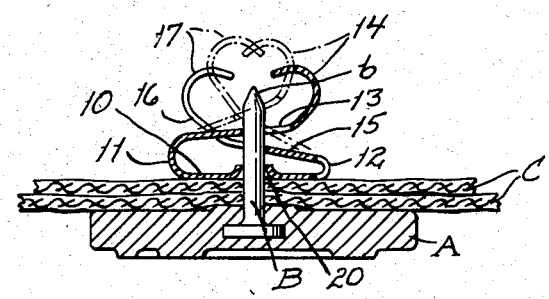

Jan. 16, 1945.                  C. H. JUDD                  2,367,283
                              FASTENING DEVICE
                            Filed March 8, 1943

INVENTOR.
Charles H. Judd,
BY Bates, Teare + McBean,
    Attorneys.

Patented Jan. 16, 1945

2,367,283

UNITED STATES PATENT OFFICE 2,367,283

FASTENING DEVICE

Charles H. Judd, Cleveland, Ohio, assignor to Tinnerman Products, Inc., Cleveland, Ohio, a corporation of Ohio Application March 8, 1943, Serial No. 478,335

11 Claims. (Cl. 85—36)

This invention relates to a fastening device adapted to grip a stud to hold an article from which the stud projects effectively in place but allowing it to be readily removed whenever desired. More particularly, my invention comprises a fastening device of spring sheet material provided with an opening for the passage of a stud and having portions doubled over to engage opposed portions of the stud, these doubled over portions being extended to provide free portions which may be manually forced toward each other to free the fastener.

My fastener is adapted for a wide variety of uses and may be made in greatly varying sizes. Among these uses may be mentioned securing insignia on wearing apparel, where the insignia should be frequently removed for cleaning the garment.

My invention is illustrated in the drawing, which, for clearness of illustration, shows the fastener in a much larger form than ordinarily employed with garment insignia.

Figure 6:
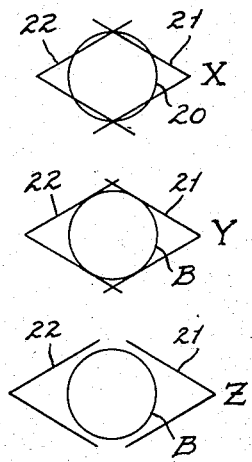
Figure 2:
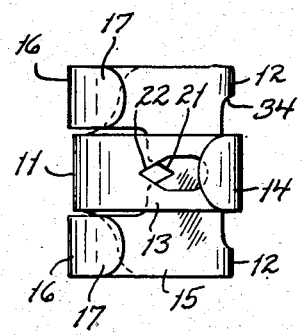
Figure 3:
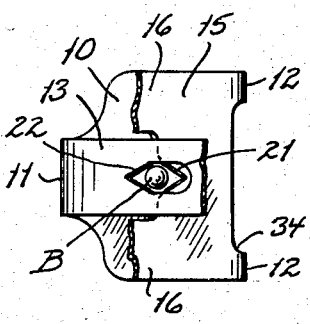
Figure 4:
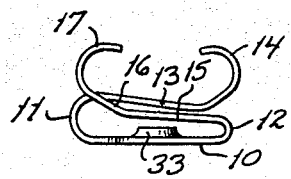
Figure 5:
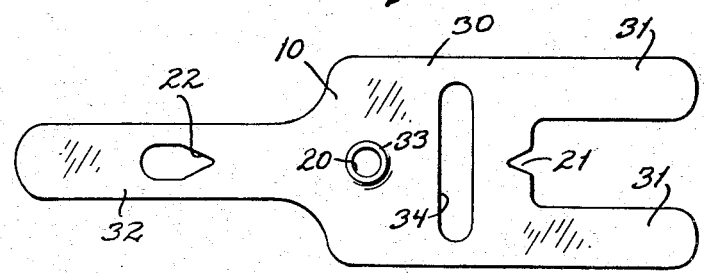

In the drawing, Fig. 1 is a sectional side elevation of my fastening device in position embracing a stud projecting from a body bearing against layers of fabric, this view showing in broken lines the releasing position of the fastener; Fig. 2 is a plan of the fastener before being applied; Fig. 3 is a plan partly broken away showing the fastener as it is being released from its position; Fig. 4 is an edge view of the fastener in its normal unapplied position; Fig. 5 is a plan of the blank from which the fastener is made by bending operations; Fig. 6 is a diagram illustrating the position of the clamping edges of the fastener, respectively in the unapplied position, the applied position, and the releasing position.

As shown in Figs. 1 to 4, my fastener is a single strip of spring sheet material, preferably metal, doubled on itself to present an intermediate portion 10 terminating in two return bends 11 and 12, and legs leading from the return bends. The legs comprise a central upper leg 13 leading from the return bend 11 and terminating in a free hooked end portion 14, and a leg 15 leading from the return bend 12 at the opposite side from the return bend 11 and dividing into two legs 16 spaced apart in the lateral alignment which straddle the leg 13 and terminate in inwardly hooked portions 17.

An opening 20 is made through the intermediate body portion 10, a V-shaped notch 21 is formed in the central edge of the common portion of the leg 15 and an opening with the V-shaped end portion 22 made in the central tongue 13. In the normal position of the device, as indicated in Fig. 4, the notches 21 and 22 overlie the opening 20 by bounding an axially extending region more constricted than the boundary provided by the opening 20, so that two V-shaped notches may bitingly engage opposite sides of a stud extending through the opening 20.

In Fig. 1, I have indicated at A any suitable device to be attached. This may be an insignia plate, which rigidly carries a projecting cylindrical stud B having a pointed end b. C indicates plies of a garment through which the stud may extend. My fastener is shown as applied to the projecting portion of the stud behind the garment plies. When so applied the stud extends freely through the opening 20 of the fastener and is first engaged on one side by the V-shaped notch 21 in the first leg of the fastener and on the other side by the V-shaped notch 22 in the second leg. The stud is thus effectively gripped by the fastener, and, as the latter engages the inner face of the garment the insignia is effectively held against the outer face.

To release the fastener it is only necessary to press the free inwardly hooked ends 14 and 17 toward each other into the position indicated in broken lines in Fig. 1, which carries each notch 20 and 22 away from the stud, so that the insignia with the stud can be readily removed.

The fastening device is constructed from a flat blank of spring sheet material of the shape indicated in Fig. 5. This blank is composed of an intermediate portion 30, two spaced tongues 31 leading from one end of the intermediate portion and a single centrally located tongue 32 leading from the other end of the intermediate portion. The opening 20 passes through the intermediate portion and is preferably flanged inwardly about the opening, as indicated at 33 to make the opening somewhat countersunk in the outer face, as shown in Fig. 1.

Across the intermediate portion 30 of the blank I prefer to cut an elongated slot 34 to increase the flexibility in this region. The V-shaped notch 21 formerly referred to is made in one extreme end of this intermediate portion 30 while the opening having the other V-shaped notch 22 is made in the central tongue 32.

Now after the blank is formed as shown in Fig. 5, the right hand portion is bent over above the intermediate portion, and the bend taking place in line with the slot 34, so that that part of the intermediate portion 30 of the blank beyond the slot 34 becomes the common portion of the bifurcated leg 15. The tongue 32 projecting from the other end of the intermediate portion of the blank is bent around a larger curve adjacent to the junction of the tongue of the body, as shown at 11 in Figs. 1 and 4, to produce the second leg 13. These two bends 12 and 11 bring the V-shaped notches 21 and 22 over the opening 20 so that the space defined by the notches is centrally aligned with the center of the opening 20 but is laterally restricted, as indicated by the diagram X in Fig. 6, which shows the relation of the edges of the two notches 21 and 22 to the opening 20.

In mounting the insignia, its stud is passed through the garment or other support and projects beyond the same; then the fastener is grasped between the operator's thumb and finger, the free hooked ends pressed together slightly, and the opening 20 is placed over the point of the stud and the fastener shoved along the stud against the garment. The pointed end of the stud and the countersunk opening 21 enable the fastener to be very readily registered with the stud.

When the free ends of the fastener are pressed inward, the V-shaped notches 21 and 22 take the position with reference to the stud B, indicated by the diagram Z in Fig. 6, so that the fastener may be readily shoved against the garment. Now when the manual restraint is removed, the inward spring of the second and third legs of the fastener carry the two notches 21 and 22 toward each other so that they come into binding engagement with the stud, as indicated by the diagram Y in Fig. 6. In this position the fastener grips the studs firmly and the insignia is retained positively in place.

My fastener is designed so that it may be manufactured in a very small form, if desired—an embodiment for instance having dimensions less than half those shown in Figs. 1 to 5. Such a fastener may readily be applied under the wearer's collar or inside of his coat to secure insignia on the exterior. For other uses the fastener may well have greater dimensions.

I claim:

1. A fastening device for a stud comprising a strip of spring material doubled on itself to provide an intermediate region having an opening for the passage of the stud and two legs extending in a generally opposite direction at acute angles to the intermediate region and having shoulders adapted to engage opposite sides of the stud respectively, the normal spring tendency of the legs when in engagement with the stud being in a direction toward the intermediate region of the fastener, and means on the legs whereby they may be swung into position making greater angles with the intermediate region to free the stud.

2. A fastening device comprising an intermediate body and two legs connected therewith and overlying the body, said body having the opening for the passage of a stud, and the legs having shoulders to engage said stud on opposite sides, said legs having also extensions adapted to be manually engaged to release the fastener.

3. A fastening device comprising a strip of spring material doubled on itself to provide an intermediate region and two legs connected therewith by return bends, the intermediate region having an opening for the passage of a stud and the folded-over legs having shoulders to engage said stud on opposite sides, said folded-over legs continuing beyond said shoulders to provide extensions adapted to be manually engaged to force the shoulders away from the stud.

4. A fastener comprising a strip of spring sheet material doubled intermediately on itself by two return bends to provide an intermediate region and two legs, an opening through the intermediate region for the passage of a stud, shoulders on two legs adapted to engage said stud on opposite sides, each leg continuing beyond the stud and being bent inwardly in hooked form to provide portions adapted to be manually gripped to release the fastener.

5. A fastener for a stud comprising a single strip of sheet material intermediately doubled on itself by two return bends to produce two legs, the intermediate region having an opening for the passage of the stud, each leg being formed with a notch providing an edge normally overhanging the boundary of the opening, each of said legs having an extension beyond the stud whereby said legs may be readily raised to free the notched edges from the stud.

6. A fastener for a stud comprising a single strip of spring sheet material intermediately doubled on itself in two parallel regions to provide a bottom layer and two inclined legs connected with the bottom layer by return bends, said legs crossing each other and each having a V-shaped notch, the edge of which normally overhangs the opening for the stud, each leg having an extension beyond its notch, said extensions being bent adjacent their ends to provide finger grips to enable the notches to be pressed away from the stud.

7. A fastener having an intermediate body portion, and two legs connected with the body portion, one of said legs being bifurcated and the other extending across the furcation, the first leg having a notch between its two leg members adapted to engage one side of a stud passing through an opening in the body portion, the second leg having an opening terminating in a notch adapted to engage the other side of such stud.

8. A fastener made of a strip of spring sheet material doubled on itself in two regions to provide an intermediate body portion and two spaced legs respectively connected with opposite ends of the body portion by return bends, one of said legs being bifurcated and the other being a single central leg, the common portion of the bifurcated leg having a V-shaped notch between the two legs adapted to engage one side of a stud passing through an opening in the body portion, the single leg having an opening terminating in a V-shaped notch adapted to engage the other side of the stud, said legs each having a free end portion beyond the respective notch bent away from the adjacent portion of such leg to provide finger grips.

9. A fastener made of a strip of spring sheet material having a body portion with an opening for the passage of a stud and two portions connected with the body portion by return bends constituting legs having V-shaped notches to engage opposite sides of the stud passed through the opening, one of the notches being the end portion of a hole through the leg, that leg being extended beyond its notch to provide means for moving the notch out of engagement with the stud.

10. A fastening device made of a single strip of sheet material doubled on itself by two return bends, providing an intermediate body portion having an opening for the passage of a stud and two legs above the body portion, one leg having a V-shaped notch to engage one side of the stud and two spaced tongues on opposite sides of the notch and the other leg comprising a single centrally located tongue having a V-shaped notch formed as an end portion of an opening through such tongue, the two tongues of the first leg and the single tongue of the second leg having their extreme portions curved upwardly and backwardly to provide extensions which may be readily gripped to free the fastener.

11. A fastener comprising a strip of spring sheet material having a body portion with an opening for the passage of a stud and overlying legs respectively connected with opposite edges of the body portion by return bends, one of said overlying legs being bifurcated and having a V-shaped notch between its leg portions adapted to engage a stud passing through the opening in the body portion, and the other leg having a portion extending through the space provided by the bifurcation, said last-named portion having an opening, the edge of which may engage the stud, said leg portions continuing beyond the opposite sides of the stud to form finger grips.

CHARLES H. JUDD.